May 18, 1926.

G. W. SMITH ET AL 1,585,429

APPARATUS FOR MANUFACTURING CARBURETED WATER GAS

Original Filed June 9, 1920    3 Sheets-Sheet 1

INVENTORS
George Wallace Smith
and Frank L. Weisser
BY
George Ramsey
their ATTORNEY INVENTORS
George Wallace Smith
and Frank L. Weisser
BY
their ATTORNEY Patented May 18, 1926.

1,585,429

UNITED STATES PATENT OFFICE.

GEORGE WALLACE SMITH, OF SAN ANTONIO, TEXAS, AND FRANK L. WEISSER, OF MIAMI, FLORIDA.

APPARATUS FOR MANUFACTURING CARBURETED WATER GAS.

Original application filed June 9, 1920, Serial No. 387,717. Divided and this application filed August 5, 1924. Serial No. 730,172.

The present invention relates to apparatus for manufacturing carbureted water gas and more particularly to means for removing objectionable carbon deposits from the apparatus without interfering with the operation thereof.

An object of the present invention is to provide an improved apparatus for manufacturing carbureted water gas in which the accumulated carbon deposits occasioned by consecutive applications of oil to the carburetor member are removed without interfering with the operation of the machine.

Another object is to provide an apparatus for oxidizing the accumulated carbon deposits at frequent intervals during the operation of the gas making machines by admitting air directly into one of the members to burn the carbon therein and to permit free passage of heat from the checker-brick to the gases and thereby greatly increase the efficiency of the apparatus.

Another object is an improved arrangement of the various machines of the apparatus to economize space and facilitate efficient operation of the respective elements.

A further object is to provide an apparatus for enriching water gas adapted to operate satisfactorily on low grades of fuel oil without decreasing the efficiency of the apparatus by formation of carbon deposits, thereby decreasing greatly the cost of the commercial gas.

A still further object is to greatly increase the life of the checker-brick in the various shells used in the manufacture of carbureted water gas and to minimize the necessity of removing and replacing same by providing an effective means for removing the carbon deposits from the checker-brick while it remains in the shells; and to do this during the usual operation of the machines without shutting them down.

Another and further object is to provide an apparatus of the type herein described having interchangeable carburetor and superheater members adapted to receive the gases in the upper part of the carburetor member, pass them through the carburetor and superheater and deliver them from the upper part of the member being used as a superheater to a suitable seal; and to provide air ducts for the admission of air into the superheater while blast gases are being admitted into the carburetor.

A more specific object is to provide an apparatus for enriching water gas having interchangeable carburetor and superheater members; to provide means for interchanging the members after a series of operating cycles; and to introduce air into the superheater member during the blow periods to remove the carbon formed in it while being used as a superheater.

A further specific object is the provision of interchangeable carburetor and superheater members having valve controlled ducts extending upwardly into each of said members to admit air during the blow period to the member being used as a superheater to burn the carbon formed therein during the time it was used as a carburetor.

Further objects of this invention contemplate an apparatus of the above characteristics, which is of such strong and simple construction as to insure its proper performance under all conditions commonly encountered in this class of work; and to provide an apparatus which will produce a high grade enriched commercial gas from a low grade of fuel oil with greater efficiency and capacity, than possible with any apparatus used heretofore with either high or low grade fuel oil.

Other and further objects of the invention will be obvious upon an understanding of the illustrative embodiment about to be described, or will be obvious from the accompanying drawings, or indicated in the appended claims; and various advantages secured by the invention other than those hereinafter specifically referred to will occur to one skilled in the art, or become evident upon the employment of the invention in practice.

A preferred embodiment has been selected for the purposes of illustration and description and is shown in the drawings, wherein, Figure 1 is a plan view of one arrangement of an apparatus illustrating the present invention, Figure 2 is a plan view of the connections and valves by means of which the present invention may be applied to the ordinary carbureted water gas apparatus.

Figure 1:
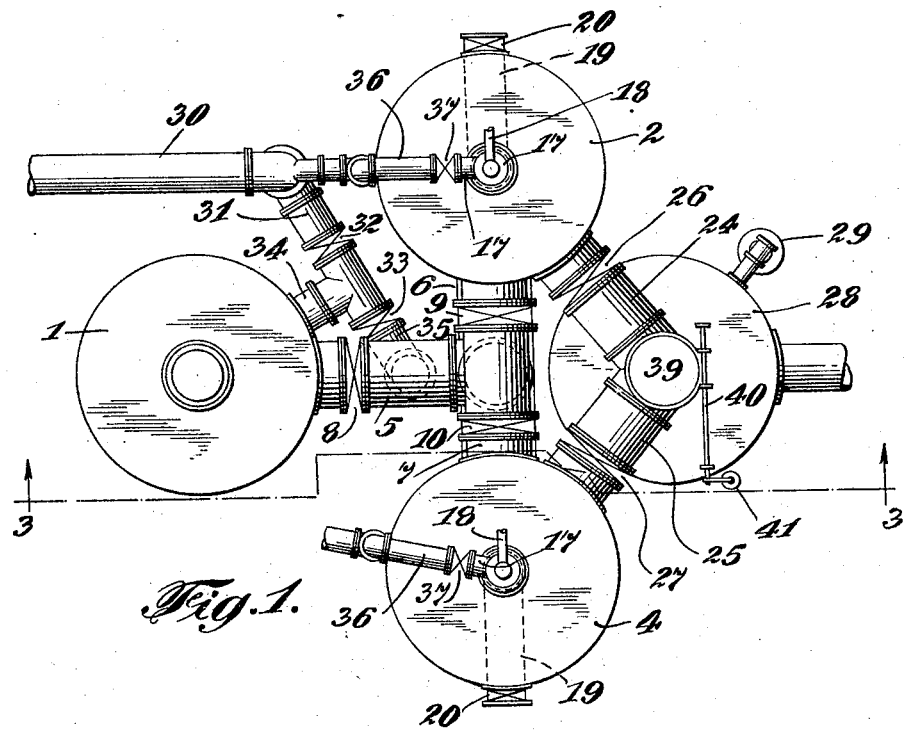

Ordinary water gas may be manufactured by passing steam through a deep bed of highly incandescent carbon, which has greater affinity for the oxygen in the steam than for the hydrogen. Theoretically, the resulting gas consists of hydrogen and carbon monoxide. Such a gas is not adapted for ordinary commercial purposes, due to the fact that its illuminating constituents are very low. Since water gas can be very cheaply manufactured, it is desirable to adapt it for commercial purposes, and this is done ordinarily by enriching it with hydrocarbons.

The present apparatus for carbureting or enriching water gas comprises a plurality of shells, usually four in number, consisting of a generator, carburetor, superheater, and a seal. These are so constructed and connected that the water gas passes from the generator into the upper part of the carburetor and from the lower part of the carburetor to the bottom of the superheater and is delivered to the seal from the upper part of the superheater. Oil is sprayed on the checker-brick in the carburetor where it is vaporized and mixed with the water gas coming from the generator and passed through the superheater where its condition is fixed.

In an apparatus of this kind a certain amount of the carbon in the fuel oil deposits on the checker-brick of the carburetor. The amount deposited depends to a great extent upon the grade of fuel oil, the low grades causing a much greater deposit than the higher grades. The formation of carbon on the checker-brick places an almost perfect heat insulation betwen the heated bricks and the gases to be heated and the efficiency of the apparatus decreases in proportion to the increase in the thickness of the deposit, thereby increasing the cost of the commercial gas. The result of this is that it is more economical with the present type of apparatus to use a high grade fuel oil and thereby decrease the carbon deposit than to use a cheaper low grade fuel oil and encounter the additional deposits. Even with high grade fuel oil, it becomes necessary at frequent intervals to remove either all or a portion of the checker-brick in the carburetor member and replace it with new bricks, necessitating an interruption in the operation of the apparatus, and decreasing its output.

The present invention eliminates the difficulties encountered heretofore by oxidizing the carbon deposits without shutting down any part of the apparatus, and without interfering with its efficient operation during such removal. The heat passes freely from the checker-brick to the gases since the carbon deposits are removed at intervals so frequent that they do not become sufficiently thick to affect the efficient operation of the apparatus. Furthermore, the checker-brick need not be removed, thereby decreasing materially the operating cost and up-keep, and at the same time permitting the use of the lower grades of fuel oil.

These advantages are secured by a proper arrangement of the various elements of the apparatus to permit interchangeability of the carburetor and superheater members at frequent intervals, which may be at the end of a series of operating cycles that is, a series of "blow and run" periods. An air duct is formed in each of the carburetor and superheater members whereby either cold or preheated air may be admitted to these members, as desired. A suitable generator furnishes the water gas which passes from the carburetor to the superheater to a suitable seal and is operated in the usual manner. That is, steam is admitted to the generator and passed through the bed of incandescent carbon to the carburetor for a certain period until the checker-brick in the latter member becomes cooled by the steam, at which time it becomes necessary to blow air through the generator, carburetor and superheater in order to increase the temperature of these members. These are ordinarily termed "air blow and steam run" periods. A certain amount of carbon is deposited on the checker-brick in the carburetor member during each of the periods, and as the operation continues the thickness of the carbon deposits increases and the area of the passages through the checker-brick decreases. In the present apparatus when a small amount of carbon has accumulated in the carburetor, the carburetor and superheater members are interchanged by suitable manipulation of the various valves and the carburetor having the deposits therein is used as a superheater. To eliminate the carbon deposits air is admitted through the duct in the superheater to the region of carbon deposits during the blow period. This free air combines with the carbon on the highly heated bricks and burns it leaving the member free from carbon and ready for use as a carburetor again.

rectly through the carburetor and superheater members if further heating is desirable.

After a series of cycles constituting "blow" and "run" periods, the shell being used as a carburetor has its checker-brick coated with carbon deposits. These deposits tend to close the passages and are very effective in preventing the heat from being communicated from the checker-brick to the gases. Both of these features are undesirable. The customary way of removing these deposits has been to continue the operation until the apparatus refused to function or ceased to function economically due to the carbon deposit and at this time to shut the apparatus down and remove the coated checker-bricks and replace with new bricks. In the present apparatus the member 2, used as a carburetor throughout a series of cycles, is interchanged and used as a superheater by opening and closing the respective valves so that the water gas delivered by generator 1 is passed through the pipes 5 and 7 into the member 4, formerly used as a superheater, but which is similar to the member 2. In using the member 4 as a carburetor and the member 2 as a superheater, the valves 8, 10 and 26 will be opened and valves 9 and 27 will be closed.

In order to remove the carbon deposits formed in the shell while it is being used as a carburetor, air is admitted through the pipe 19, valves 20, and extension 22 into the center portion of the checker-brick in the region of the carbon deposits. Air is admitted to the pipe 19 during the blow periods only and, therefore, does not affect the quality of the commercial gas or interfere in any way with the operation of the machines. Furthermore, air is admitted to the member being used as a superheater, while its temperature is extremely high, and a localized oxidizing zone is formed directly around the carbon deposits, and they are entirely removed while similar carbon deposits are being formed in the other member being used as a carburetor. The carburetor and superheater members are interchanged frequently and since the carbon deposits are removed once during each change, they never accumulate sufficiently to materially effect the efficiency of the apparatus. The deposits are removed increasing the labor over that required by the ordinary operation of such an apparatus and eliminates the necessity for shutting down the machine.

It will be seen that the present invention provides an apparatus for quickly and effectively removing all carbon deposits without shutting down the apparatus or affecting the operation of the same in any manner. The apparatus is simple in construction and easy to manufacture from readily obtainable parts. Furthermore, the present invention may be applied to the types of apparatus now in use by changes which can be readily and inexpensively made.

While the preferred embodiment of the present invention is described in detail with reference to the drawings herein, it is not intended to limit the invention to the present disclosure, as many changes can be made without departing from the essential principles embodied herein. The description is to be taken as illustrative and not in the limiting sense, as the scope of the invention is defined in the following claims. The method herein disclosed is claimed in our copending application Serial Number 387,717, now Patent No. 1,508,807, of which this is a division.

Having thus described our invention, what we claim is:—

1. In an apparatus of the class described, in combination, a pair of interchangeable carburetor and superheater members, a generator for supplying gases to the member being used as a carburetor in alternate "blow" and "run" periods, and means for admitting air directly into the member being used as a superheater while said generator is supplying blast gases to said carburetor.

2. In an apparatus of the class described, in combination, a pair of interchangeable carburetor and superheater members, a generator for supplying gases to the member being used as a carburetor in alternate "blow" and "run" periods, and a pipe adapted to be connected to a source of air supply extending into the member being used as a superheater to admit air thereto while said generator is supplying gases to said carburetor.

3. In an apparatus of the class described, in combination, a pair of interchangeable carburetor and superheater members, a generator for supplying gases to the member being used as a carburetor in alternate "run" and "blow" periods, a pipe adapted to be connected to an independent source of air supply extending into the member being used as a superheater, and means controlling the flow of air through said pipe independently of the operation of the carburetor.

4. In an apparatus of the class described, in combination, a pair of interchangeable carburetor and superheater members, a generator for supplying gases to the member being used as a carburetor, air conduits communicating with the upper portions of each of said members, and independent air pipes extending into the lower portions of said members.

5. In an apparatus of the class described,

The interchanging of the carburetor and superheater members and the introduction of air into the member being used as a superheater eliminates completely the carbon deposits irrespective of the grade of fuel oil used. Furthermore, it is not necessary to shut down the machines or remove the checker-brick, thereby greatly increasing the output and minimizing the cost of the final product.

Referring more particularly to the drawings, there is illustrated one arrangement of the apparatus with suitable connecting pipes and valves forming a preferred embodiment of the present invention. In this arrangement there is provided a generator 1 connected to a pair of interchangeable carburetor and superheater members 2 and 4 by means of a main pipe 5 and branch pipes 6 and 7 connected thereto. A valve 8 in the main pipe 5 and valves 9 and 10 in the branch pipes 6 and 7 control the flow of gases from the generator 1 to the other parts of the apparatus.

The carburetor and superheater members 2 and 4 are substantially identical in construction and are joined at their lower ends by conduit 12. The interior of each of these members comprises a suitable shell having checker-brick work 14 laid therein with a substantial space 15 at the upper part of the shell and a similar space 16 in the lower part of the shell. The connecting pipe 12 forms a communication between the lower spaces in the respective members. The upper end of each of the shells has suitable connections 17 and 18 for air and oil respectively. A pipe 19 controlled by valve 20 leading from a suitable source of air supply extends through the lower part of each shell into the space 16. A suitable elbow 21 connects it with an extension 22 which extends into the checker-brick work 14 and communicates preferably with the center portion thereof. The function of the pipe 19 forming an air duct into the interior of the checker-brick work 14 will be described hereinafter.

Pipes 24 and 25 controlled by valves 26 and 27 connect the spaces 15 in the upper parts of the shells to a suitable seal 28 which is provided with a drain 29, and which is adapted to wash the gases delivered to it, and to prevent their return to the shells.

Figure 2:
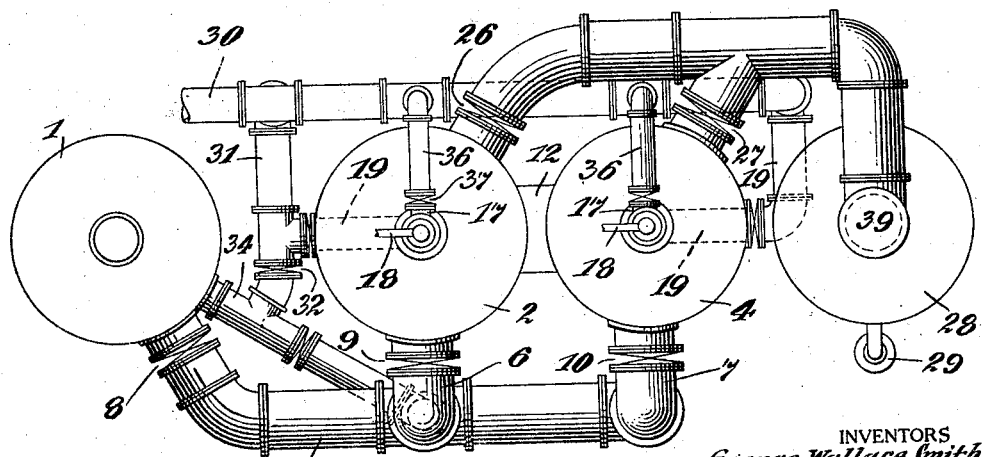
Figure 3:
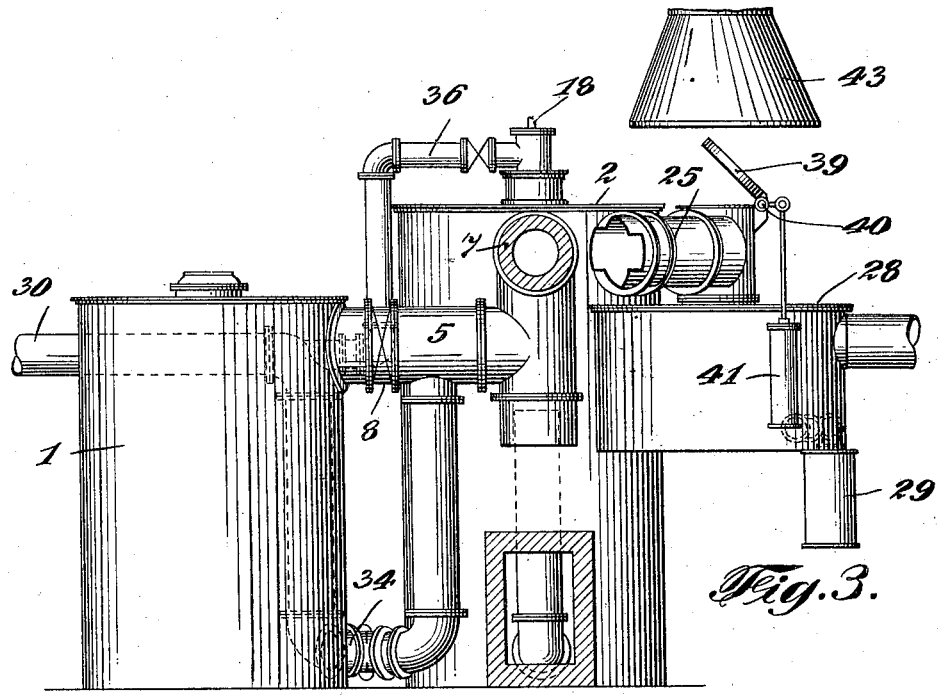
Figure 3 is a view showing a cross-section of the layout shown in Figure 1 along the line 3—3
Figure 4:
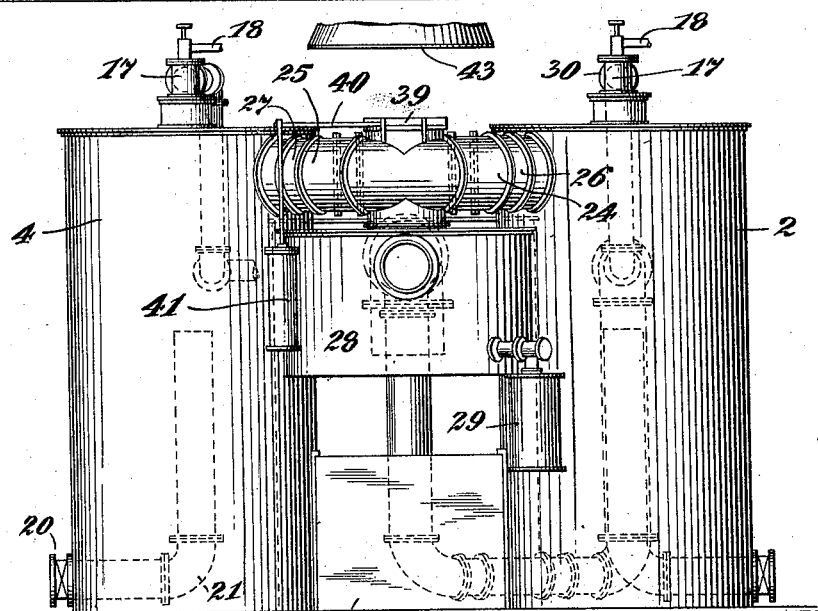
Figure 4 is an end elevational view of the apparatus shown in Figure 1 from the end on which the seal is located.
Figure 5:
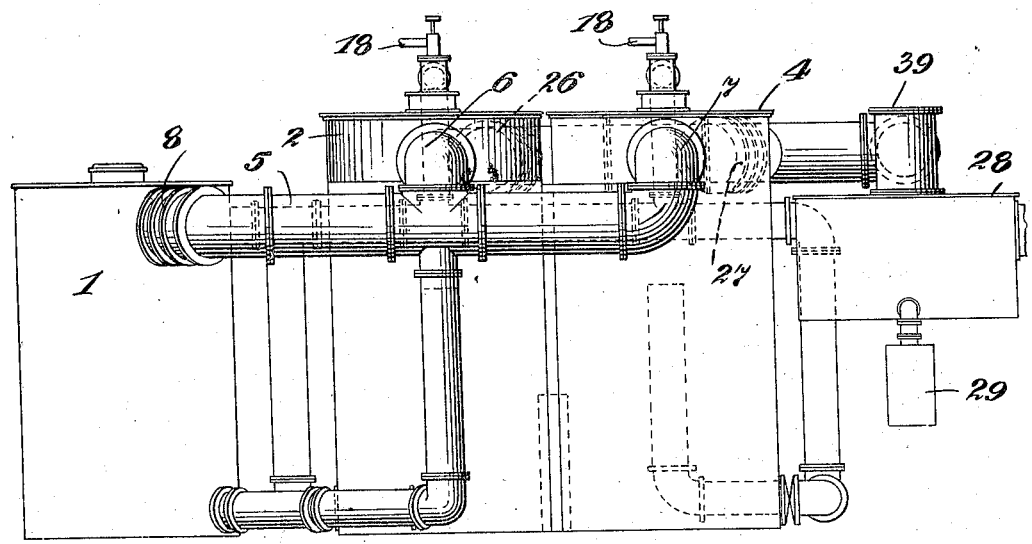
Figure 5 is a side elevational view of the layout shown in Figure 2.
Figure 6:
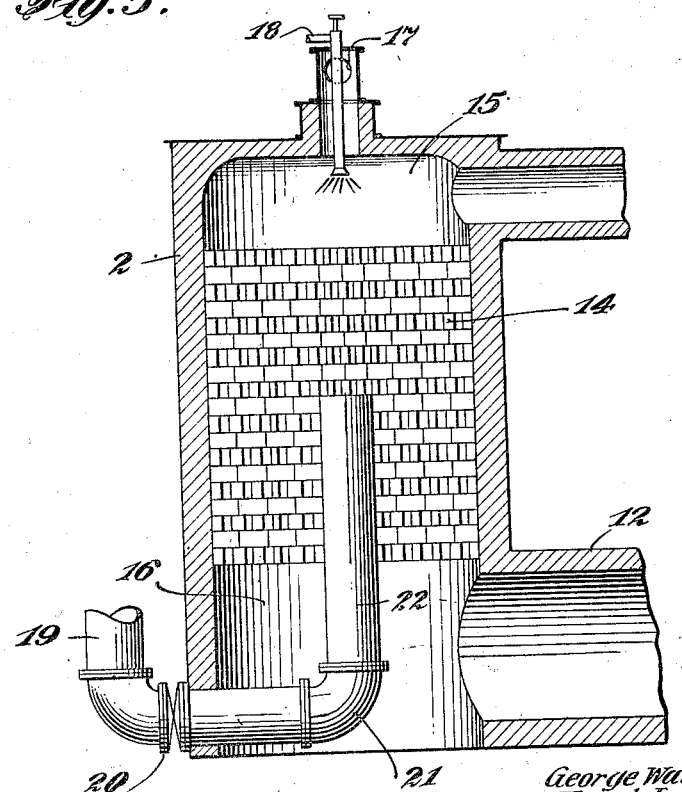
Figure 6 is a view showing a vertical section through one of the shells showing generally the checker-brick therein and the preferred form of air duct for admitting air into the superheater to form an oxidizing zone.

A pipe 30 leading from a suitable source of compressed air which is preferably preheated, is connected to the lower part of the generator 1 by means of pipe 31, valve 32 and pipe 34 extending into the generator. The pipe 31 is also connected through valves 32 and 34 and pipe 35 to pipe 5. The upper parts of the carburetor and superheater members 2 and 4 are connected with the blast pipe 30 by means of pipes 36 attached to the connections 17 and controlled by valves 37. The pipe 19, forming an air duct into the checker-brick 14 of the respective shells, may be connected to any suitable source of air preheated or otherwise, but preferably is connected to the blast pipe 30, as shown in Figures 2 and 5.

In the operation of the apparatus, assuming the shells to be heated to operating temperatures, water-gas is formed in the generator 1 in the customary manner by alternately forcing air and steam through a suitable bed of incandescent carbon. The resulting gas is passed during the "run" period through the pipe 5 and valve 8 to either of the members 2 or 4, which acts as a carburetor the other member acting as a superheater, assuming that member 2 is acting as a carburetor and the member 4 as a superheater, then oil will be admitted to the member 2 through the pipes 18. The valves 8 and 9 in pipes 5 and 6 will be open and likewise valve 27 in pipe 25. Valves 10 and 26 in pipes 7 and 24 will be closed. The water gas will then be passed through pipes 5 and 6 into the upper portion of the carburetor 2, where oil is admitted through pipe 18, which encounters the heat from the checker-brick 14 and combines with the water gas and passes to the bottom of the carburetor 2 and through the pipe 12 into the superheater 4 and through pipe 25 into the seal 28 where the gas is washed and delivered to other apparatus for further treatment or to a reservoir for storage. In passing through the superheater 4 the gases are "fixed" and prevented from returning to their original state.

The generator 1 continues to deliver gas to the carburetor 2 for a short period of time until either the checker-brick in the respective shells becomes too cool to carburet or "fix" the gas properly or the fuel bed in the generator needs to be further heated, in which case the "run" period is terminated and the "blow" period is begun by cutting off the steam from the generator and passing air, cold or preheated through the bed of carbon and permitting it to follow the same path that the water-gas followed in the previous "run" period, excepting that the gas, instead of being passed, into the seal 28 is permitted to escape through the valve 39 at the junction of the pipes 24 and 25 into a stack 43. A suitable shaft 40 having a weight 41 attached to an arm thereon is adapted to retain this valve 39 in either open or closed position. The blast gases are to raise the temperature of the fuel bed and of the checker brick and superheater members and they do not form a part of the carbureted gas, nor affect its quality in any manner. Additional preheated air may be passed diin combination, a pair of interchangeable carburetor and superheater members, a generator for supplying gases to the member being used as a carburetor, air conduits communicating with the upper portions of each of said members, and independent air pipes extending into the lower portions of said members and communicating with the central portions thereof.

6. In an apparatus of the class described, in combination, a pair of interchangeable carburetor and superheater members having a suitable brick checker-work formed therein, a generator for supplying gases to the member being used as a carburetor, air conduits communicating with the portions of said members above said checker brick, and air pipes extending into said members and adapted to be connected to an independent source of air supply for admitting air to said members during the air blasting periods independently of the normal operation of the apparatus.

7. In an apparatus of the class described, in combination, a pair of interchangeable carburetor and superheater members having suitable brick checker-work formed therein, a generator for supplying gases to the member being used as a carburetor, air conduits communicating with the portions of said members above said checker brick, and air pipes entering said members and extending upwardly into the checker brick and communicating with the center portions thereof.

8. In an apparatus of the class described, in combination, a pair of interchangeable carburetor and superheater members having a suitable brick checker-work formed therein, a generator for supplying gases to the member being used as a carburetor, air conduits communicating with the portions of said members above said checker brick, air pipes extending upwardly into the center portions of said members and valves in said pipes for admitting air to the central portions of the checker brick to remove the carbon deposits therefrom during the air blasting periods.

9. In an apparatus of the class described, in combination, a pair of shells having a suitable brick checker-work formed therein to form carburetor and superheater members, a conduit connecting the lower portions of said shells, a generator operatively connected to one of said shells for supplying gases thereto in alternate "blow" and "run" periods, and independent means extending into the checkerwork for introducing air into the other of said shells during the blow period to remove the carbon deposits therein.

10. In an apparatus of the class described, in combination, a pair of shells having suitable brick checker-work formed therein to form carburetor and superheater members, a conduit connecting said shells, a generator operatively connected to one of said shells for supplying gases thereto, and a pipe extending into the lower portion of the other of said shells and upwardly into the central portion of the checker-work and adapted to admit air to remove the carbon deposits therein.

11. In an apparatus of the class described, in combination, a pair of interchangeable carburetor and superheater members, said members being provided with suitable brick checker-work, a conduit connecting the lower portions of said members, a gas generator for supplying gases to one of said members in alternate "blow" and "run" periods, devices for admitting oil to the same member during the "run" periods to enrich the gases supplied, and means for introducing free air directly into the other of said members during the blow periods to remove the carbon therein.

12. In an apparatus of the class described, in combination, a pair of interchangeable carburetor and superheater members having suitable checker-work therein, a gas generator for supplying gases to the member being used as a carburetor in alternate "blow" and "run" periods, devices for admitting oil to the carburetor member during the "run" periods to enrich the gases supplied, a conduit for admitting air to the member being used as a carburetor during the "blow" periods, and an air pipe communicating with the member being used as a superheater for introducing free air directly into the superheater member during the "blow" periods to remove the carbon deposits therein.

13. In an apparatus of the character described, the combination comprising a pair of shells provided with suitable checker-work adapted to be used for carburetor and superheater shells, a gas generator, connections from said generator to said shells, means for reversing the flow of gases through said members, thereby changing said carburetor to a superheater, and means extending into the central portions of said shells for admitting air independently of the blast gases into the member being used as a superheater to create a localized oxidizing zone therein to remove the carbon deposits therefrom.

14. In an apparatus of the class described, a pair of interchangeable carburetor and superheater members, having suitable checker-work therein, a conduit connecting the lower portions of said members, a gas generator operatively connected to the upper portions of said members, air conduits leading to the upper part of said members, and other air conduits adapted to admit air directly into the member receiving blast gases from the member being used as a carburetor to create a localized oxiding zone in the member being used as a superheater to remove the carbon deposits therefrom.

15. In an apparatus of the class described, in combination, a pair of interchangeable carburetor and superheater members, said members being provided with suitable brick checker-work, a gas generator, connections from said gas generator to said shells, valves in said connections for directing the flow of gases from said generator to either of said shells, a conduit connecting the lower portion of said shells to permit the passage of gases from one of said members to the other, pipes in the lower portions of each of said shells, and valves in said pipes for admitting air, independently of the gas making operations of the apparatus, into the member not receiving gases directly from the generator, thereby creating a localized oxidizing zone for removing the carbon therefrom.

16. In an apparatus of the class described, in combination, a pair of interchangeable carburetor and superheater members, suitable brick checker-work in said members, a conduit connecting the lower portions of said members to permit the passage of gases from one member to the other, conduits connecting the upper portions of said members to a seal, and pipes leading into the lower portions of each of said members for the admission of air thereto independently of the gases passing through the conduit connecting the lower portons of the two members.

17. In an apparatus of the character described, the combination comprising a pair of shells provided with suitable checker-work adapted to be used for carburetor and superheater shells,, a gas generator, connections from said generator to one of said shells, and a pipe extending into the checker-work of the other of said shells for independently conducting air to the region of carbon deposits therein to create a localized oxidizing zone for burning and removing the carbon deposits therein.

18. In an apparatus of the character described, the combination comprising a pair of shells provided with suitable checker-work adapted to be used for carburetor and superheater shells, a gas generator, connections from said generator to one of said shells, a pipe extending upwardly into the central portion of the checker-work of the other of said shells, and means for admitting air through the pipe leading to the checker work in the superheater to oxidize and remove the carbon therein.

GEORGE WALLACE SMITH.
FRANK L. WEISSER.